(12) United States Patent
O'Brien et al.

(10) Patent No.: US 9,130,337 B1
(45) Date of Patent: Sep. 8, 2015

(54) SYSTEM AND METHOD FOR AUTOMATIC GAS OPTIMIZATION IN A TWO-CHAMBER GAS DISCHARGE LASER SYSTEM

(71) Applicant: Cymer, LLC, San Diego, CA (US)

(72) Inventors: Kevin O'Brien, San Diego, CA (US); Joshua Thornes, San Diego, CA (US); Michael Borrello, Carlsbad, CA (US)

(73) Assignee: Cymer, LLC, San Diego, CA (US)

( * ) Notice: Subject to any disclaimer, the term of this patent is extended or adjusted under 35 U.S.C. 154(b) by 0 days.

(21) Appl. No.: 14/483,082

(22) Filed: Sep. 10, 2014

(51) Int. Cl.
*H01S 3/22* (2006.01)
*H01S 3/036* (2006.01)
*H01S 3/23* (2006.01)
*H01S 3/225* (2006.01)

(52) U.S. Cl.
CPC . *H01S 3/036* (2013.01); *H01S 3/22* (2013.01); *H01S 3/225* (2013.01); *H01S 3/2251* (2013.01); *H01S 3/2256* (2013.01); *H01S 3/2308* (2013.01)

(58) Field of Classification Search
CPC ..... H01S 3/036; H01S 3/2308; H01S 3/2251; H01S 3/2256; H01S 3/225; H01S 3/22
USPC .......................................... 372/59, 58, 57, 55
See application file for complete search history.

(56) References Cited

U.S. PATENT DOCUMENTS 8,411,720 B2* 4/2013 O'Brien et al. .................. 372/55
2012/0275481 A1* 11/2012 Riggs .............................. 372/59

* cited by examiner

*Primary Examiner* — Kinam Park
(74) *Attorney, Agent, or Firm* — Gard & Kaslow LLP (57) ABSTRACT

A system and method for automatically performing gas optimization after a refill in the chambers of a two chamber gas discharge laser is disclosed. The laser is fired at low power, and the gas in the amplifier laser chamber bled if necessary until the discharge voltage meets or exceeds a minimum value without dropping the pressure below a minimum value. The power output is increased to a burst pattern that approximates the expected operation of the laser, and the amplifier chamber gas bled again if necessary until the voltage and an output energy meet or exceed minimum values, or until the pressure is less than a minimum value. The gas in the master oscillator chamber is then bled if necessary until the output energy of the master oscillator meets or falls below a maximum value, again without dropping the pressure in the chamber below the minimum value. While the pressure is adjusted, bandwidth is also measured and adjusted to stay within a desired range. Once the target values are provided, the process runs quickly without manual interaction.

20 Claims, 4 Drawing Sheets

SYSTEM AND METHOD FOR AUTOMATIC GAS OPTIMIZATION IN A TWO-CHAMBER GAS DISCHARGE LASER SYSTEM

FIELD OF THE INVENTION

The present invention relates generally to laser systems. More specifically, the invention relates to optimizing the gas in the chambers of a two chamber gas discharge laser such as a Master Oscillator-Power Amplifier excimer laser after a refill operation.

BACKGROUND OF THE INVENTION

One type of gas discharge laser used in photolithography is known as an excimer laser. An excimer laser typically uses a combination of a noble gas, such as argon, krypton, or xenon, and a reactive as such as fluorine or chlorine. The excimer laser derives its name from the fact that under the appropriate conditions of electrical stimulation and high pressure, a pseudo-molecule called an excimer (or in the case of noble gas halides, an exciplex) is created, which can only exist in an energized state and can give rise to laser light in the ultraviolet range.

Excimer lasers are widely used in high-resolution photolithography machines, and are thus one of the critical technologies required for microelectronic chip manufacturing. Current state-of-the-art lasers may produce deep ultraviolet (DUV) light from the KrF and ArF excimer lasers with nominal wavelengths of 248 and 193 nanometers respectively.

While excimer lasers may be built with a single chamber light source, the conflicting design demands for more power and reduced spectral bandwidth have meant a compromise in performance in such single chamber designs. One way of avoiding this design compromise and improving performance is by utilizing two chambers. This allows for separation of the functions of spectral bandwidth and pulse energy generation; each chamber is optimized for one of the two performance parameters.

Such dual-gas-discharge-chamber excimer lasers are often called Master Oscillator-Power Amplifier, or "MOPA," lasers. In addition to improving the spectral bandwidth and pulse energy, the efficiency of the dual chamber architecture can enable the consumable modules in MOPA lasers to reach longer operational lifetimes than their counterpart modules in single chamber light sources.

In each chamber, as the light source discharges energy across its electrodes to produce light, some of the halogen gas, fluorine in the case of ArF or KrF lasers, is depleted. This causes a decrease in the laser efficiency which is seen, for example, as an increase in discharge voltage required to create a given desired pulse energy. Since the discharge voltage has an upper limit determined by physical constraints of the hardware, steps must be taken to replenish the lost fluorine so that the voltage remains below this limit and the laser continues to function properly.

One way to do this is with a full replenishment of the gas in the chambers, called a refill, where all of the as is replaced while the laser is not firing to return the gas content in the chamber to the desired mix, concentration and pressure. However, refills are extremely disruptive as the laser must be shut off during the refill process, and thus the lithographic exposure of chips must also be paused in a controlled, manner at the same time and then restarted when the laser is again operational to avoid improper processing of the chips. For this reason, it is typical to refill both chambers at once to save time, although this is not necessary.

The need for a refill can depend on several complex and often unpredictable variables, including the light source firing pattern and energy, the age of the light source modules, and others that will be familiar to those of skill in the art. For this reason, refills are typically done on a regular schedule, which ensures that the light source operation will never suffer unanticipated interruption due to the light source reaching its operational limit. Such a regular schedule generally yields very conservative upper limits on the time between refills, such that some users of the light source operating at low pulse usages might be able to wait for a much longer period of time between refills than is provided by the simple schedule.

Given the demands of increased throughput and light source availability, efforts have been made to minimize light source stoppage for refills. One way of doing this is by performing a partial replenishment of the gas in the chambers, known as an inject, rather than a full refill. As long as the laser is able to continue to operate within certain parameters, it is not necessary to shut the laser down for the inject, and thus processing of chips may continue during the inject process. However, the performance of the laser still tends to change over time in such a way that injects become inadequate to compensate, and so refills are still performed at regular intervals, although much less frequently than if injects are not used.

In a refill operation, the remaining as in the laser chambers is evacuated, and, then, new gas is introduced into the chambers in an amount intended to arrive at a particular pressure and concentration of fluorine. The target pressure and concentration of gas in the laser chambers at the end of a refill is typically determined by the specific type and model of laser (and may even be similar for all dual chamber lasers), and cannot take into account the particular characteristics of a specific laser, such as its age. Further, as the shot interval between refills increases, the changes in laser performance due to ageing of the laser become more significant. It is thus desirable to start operation of the laser after a refill in as close to an optimum condition as possible.

Accordingly, a refill may be followed by gas optimization, which is intended to provide the best gas conditions for initial operation of the specific laser. Optimizing the as allows the specific laser to begin operation at its most efficient point, allowing for longer operation before another refill is required.

To optimize the gas, an engineer test-fires the laser to determine its operating parameters, in particular the discharge voltage and the output energy. If the laser is not operating within the desired parameters, the engineer adjusts the gas in the chambers, and another test-fire done. This is repeated until the desired operating parameters are obtained.

There are some issues inherent in performing gas optimization. The optimization process is typically one of trial and error, so that even an experienced engineer will have some difficulty in obtaining the optimal gas state. This also means that optimization is not easily repeatable; different engineers may produce different optimizations of the same laser, and even a single engineer may not be able to replicate an earlier result. Finally, if errors are made, it may be necessary to repeat the optimization process, resulting in additional downtime of the laser.

A more accurate method of optimizing the gas can mitigate or eliminate many or all of these issues, and allow the laser to operate for a longer period of time before another refill must be performed. Further, a good optimization provides a better basis on which to base the calculation of subsequent injects to the laser chambers. It is thus desirable that optimization be performed in a fashion that results in the most efficient gas state for the particular laser used.

Another issue is the time spent in optimization. Since the MOPA laser is not being used for processing while optimization is being done, it is desirable to complete the optimization in as short a period as possible, preferably in a matter of a few minutes at most. Automatic optimization is generally faster than manual optimization, and may reduce the risk that another optimization, or even a full refill, may be needed if the result of the optimization is not adequate.

One type of automatic gas optimization is described in U.S. Pat. No. 8,411,720, commonly owned by the assignee of the present application. However, the optimization described therein is based upon measurement of chamber pressure, discharge voltage and output energy, and does not take into account the bandwidth of the laser output. Further, in that method only the gas in the power amplifier is optimized.

As MOPA lasers have continued to improve, it has become apparent that keeping the bandwidth of the output in a desired range is an additional concern, and that bandwidth is related to the pressure, discharge voltage and output energy. It has also become apparent that optimizing the gas in the master oscillator is also related and thus desirable. Reaching all of the desired values can create conflicts which may prevent one or more of these parameters from being within a desirable range. In particular, it is desirable to minimize the risk of reaching a pressure state at which the output energy is as desired but the desired, bandwidth is no longer attainable by including bandwidth adjustments during the optimization process.

An automatic refill optimization process that provides a highly accurate gas state, while allowing for control of all of the desired operating parameters including bandwidth of the output beam, is thus of value.

SUMMARY OF THE INVENTION

A system and method for automatically and accurately optimizing the gas in the power amplifier and master oscillator laser chambers of a two chamber gas discharge laser such as a MOPA excimer laser after the chambers have been refilled is disclosed. Certain desired parameters are defined, and a controller then performs the optimization without intervention or action by the user. The laser is test fired in several sequences, and gas bled from the amplifier laser chamber during each sequence, if necessary, to keep the operating parameters of the laser within the defined parameters to the extent possible, resulting in a gas condition in the amplifier and master oscillator laser chambers as close to optimal as possible given the conditions existing at the end of the gas refill.

In, one embodiment, a dual chamber gas discharge laser light source is described, comprising a master oscillator having a laser chamber containing a lasing medium gas comprising a halogen for producing an output energy; an amplifier having a laser chamber containing a lasing medium as comprising a halogen for producing an amplified output energy; a gas optimization system including a controller automatically executing an optimization scheme after a refill of the as in the master oscillator and amplifier laser chambers, the optimization scheme comprising: a first sequence in which the laser is fired at a first target power level while: measuring a discharge voltage and, if the discharge voltage is below a predetermined minimum value, bleeding gas from the amplifier Chamber until the discharge voltage is equal to or greater than the minimum, value; and setting to an initial position a controller Which adjusts magnification of an optical element in a laser beam path in the master oscillator to an initial position; a second sequence in which the laser is fired in bursts at a second target power level while measuring the output energy, bandwidth of the output, and discharge voltage, and; if a spectral bandwidth of the output beam is not within a desired range, changing the position of the controller which adjusts magnification of the optical element in the master oscillator until the bandwidth is within the desired range; if either the output energy or the discharge voltage are below a respective predetermined minimum value, bleeding gas from the amplifier chamber until both the output energy and the discharge voltage are equal to or greater than their respective minimum values or the pressure in the amplifier chamber falls to a minimum value; and a third sequence in which the laser is fired in bursts at the second target power level while measuring the output energy and bandwidth, and; if the bandwidth is not within the desired range, changing the magnification of the laser beam in the power amplifier until the bandwidth is within the desired range; if the output energy is above a predetermined target maximum value, bleeding as from the master oscillator chamber until the output energy is equal to or less than its target maximum value.

In another embodiment, a method of automatically optimizing the gas in the laser chambers of a dual chamber gas discharge laser light source having a master oscillator and a power amplifier is described, each of the master oscillator and amplifier having a laser chamber containing a lasing medium gas comprising a halogen, the method of optimizing the gas comprising the steps of: firing the laser in continuous mode at a first target power level while: receiving in a controller a measured value of a discharge voltage and determining in the controller whether the discharge voltage is below a predetermined minimum value, and, if so, directing by the controller that gas be bled from the amplifier chamber until the discharge voltage is equal to or greater than the minimum value; and setting to an initial position a controller which adjusts magnification of an optical element in a laser beam path in the master oscillator to an initial position; firing the laser at a second target power level while receiving in the controller measured values of output energy, bandwidth of the output, and discharge voltage, and; determining in the controller whether the bandwidth of the output beam is not within a desired range, and, if not, directing by the controller that the magnification of the optical element in the master oscillator be changed until the bandwidth is within the desired range; determining in the controller whether either the output energy or the discharge voltage are below a respective predetermined minimum value, and, if so, directing by the controller that gas be bled from the amplifier chamber until both the output energy and the discharge voltage are equal to or greater than their respective minimum values or the pressure in the amplifier chamber falls to a minimum value; and upon completion of bleeding gas from the amplifier chamber, determining in the controller whether the output energy is above a predetermined target maximum value, and, if so, bleeding as from the master oscillator chamber until the output energy is equal to or less than its target maximum value.

Still another embodiment discloses a non-transitory computer-readable medium having embodied thereon a program, the program being executable by a processor to perform a method of automatically optimizing the as in the laser chambers of a dual chamber gas discharge laser light source having a master oscillator and a power amplifier is described, each of the master oscillator and amplifier having a laser chamber containing a lasing medium gas comprising a halogen, the method of optimizing the as comprising the steps of: firing the laser in continuous mode at a first target power level while: receiving in a controller a measured value of a discharge voltage and determining in the controller whether the discharge voltage is below a predetermined minimum value, and, if so, directing by the controller that gas be bled from the amplifier chamber until the discharge voltage is equal to or greater than the minimum value; and setting to an initial position a controller which adjusts magnification of an optical element in a laser beam path in the master oscillator to an initial position; firing the laser at a second target power level while receiving in the controller measured values of output energy, bandwidth of the output, and discharge voltage, and; determining in the controller whether the bandwidth of the output beam is not within a desired range, and, if not, directing by the controller that the magnification of the optical element in the master oscillator be changed until the bandwidth is within the desired range; determining in the controller whether either the output energy or the discharge voltage are below a respective predetermined minimum value, and, if so, directing by the controller that gas be bled from the amplifier chamber until both the output energy and the discharge voltage are equal to or greater than their respective minimum values or the pressure in the amplifier chamber falls to a minimum value; and upon completion of bleeding gas from the amplifier chamber, determining in the controller whether the output energy is above a predetermined target maximum value, and, if so, bleeding gas from the master oscillator chamber until the output energy is equal to or less than its target maximum value.

DETAILED DESCRIPTION OF THE INVENTION

The present application describes a system and method for automatically and accurately optimizing the gas in the amplifier chamber and master oscillator chamber of a two chamber gas discharge laser such as a MOPA excimer laser after a refill of the chambers. It is expected that a fully automated optimization process will result in increased accuracy and mitigate or eliminate many of the issues associated with manual optimization.

Once certain defined parameters are entered, the process is run by, for example, a controller, without intervention or action by the user. The laser is test fired in several sequences, and gas bled from the amplifier laser chamber during each sequence, if necessary, to keep the operating parameters of the laser within the defined parameters to the extent possible. This results in the gas condition in the amplifier laser chamber being as close to optimal as possible given the conditions existing at the end of the gas refill.

Figure 1:
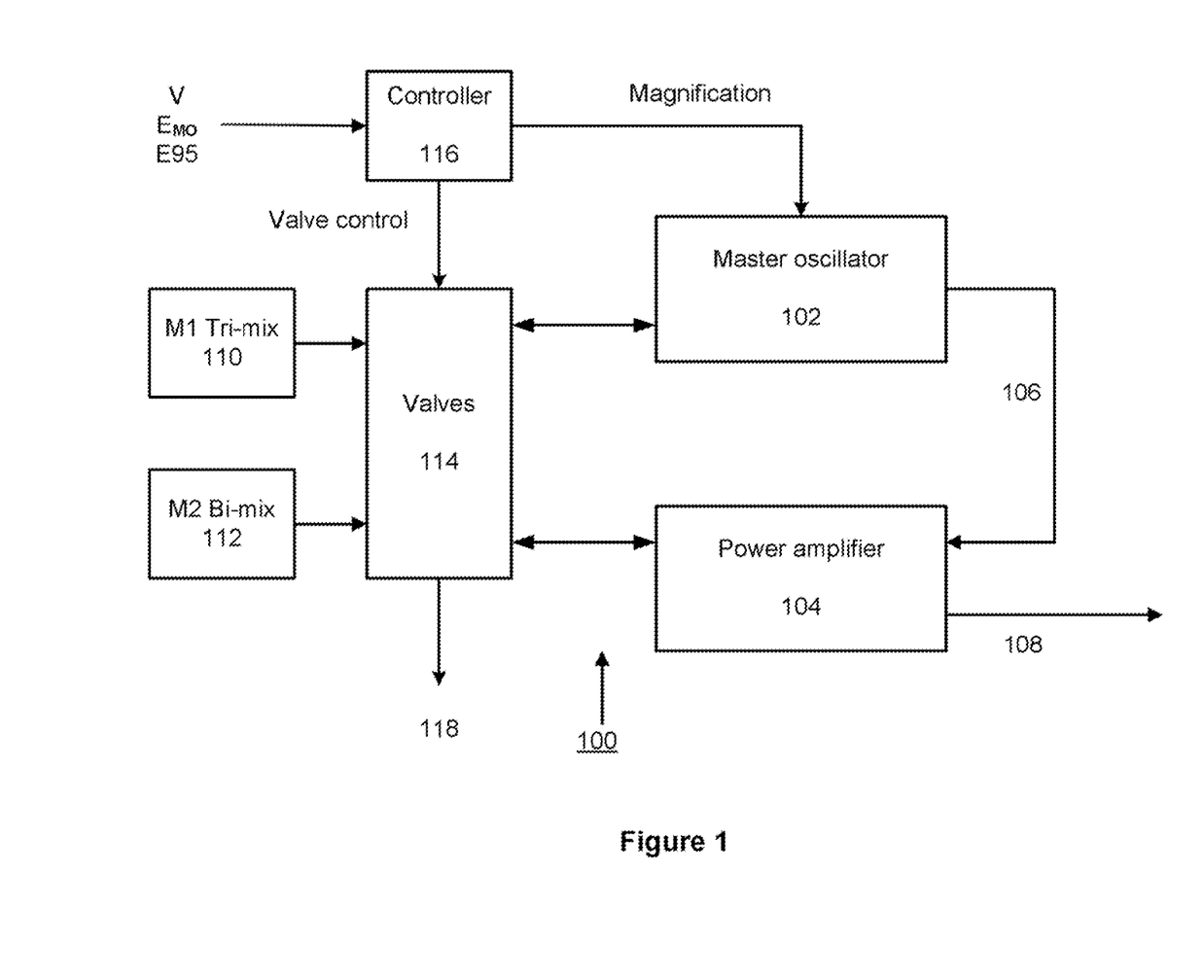
FIG. 1 shows a simplified block diagram of an automatic gas refill system 100 for a dual chamber gas laser, such as a MOPA excimer laser, according to one embodiment.

A simplified block diagram of a gas replenishment system 100 for a dual chamber gas laser, such as a MOPA excimer laser, is shown in FIG. 1. The MOPA excimer laser has a master oscillator 102 containing a seed laser module with a laser chamber, and a power amplifier 104 also containing a laser chamber. In operation, the master oscillator 102 produces a first laser beam 106 which is passed to the power amplifier 104 where it is amplified, to produce an amplified laser beam 108 which is output to a scanner machine (not shown) for use in lithography.

Each laser Chamber contains a mixture of gases; for example, in a given excimer laser each laser Chamber might contain a halogen, e.g., fluorine, along with other gases such argon, neon, and possibly others in different partial pressures that add up to a total pressure P. Gas bottles 110 and 112 are connected to the master oscillator 102 and power amplifier 104 through valves 114 to allow for replenishment of the gas in the laser chambers when desired. In an ArF laser, gas bottle 110 typically might contain a mixture of gases including fluorine, argon and one or more other rare gases, known as an "M1 mix" or "tri mix," while gas bottle 112 might contains a mixture of argon and one or more other gases, but no fluorine, known as an "M2 mix" or "bi-mix." A controller 116, such as a processor or logic circuit, operates the valves 114 to transfer gases from bottles 110 and 112 into the laser chambers of the master oscillator 102 and power amplifier 104 in a refill or inject, or to bleed gas from the laser chambers when necessary. Bled gas is typically not returned to the bottles but is vented at 118.

As is known in the art, two bottles of gas are needed, since the fluorine in gas bottle 110 is at a particular partial pressure that is typically higher than that desired for laser operation. In order to add the fluorine to the laser chamber of the master oscillator 102 or power amplifier 104 at a desired lower partial pressure, the gas in bottle 110 must be diluted, and the non-halogen containing gas in bottle 112 is used for this purpose.

Although not shown, valves 114 typically include two valves for each laser chamber, an "injection" valve that allows gas to pass into and out of each chamber at a first rate, and a "chamber fill" valve that allows gas to pass into and out of each chamber at a second, and faster, rate.

As described above, when a refill of the laser chambers is performed, all of the gas in the chambers is replaced, and an attempt is made to arrive at a specific pressure and concentration of fluorine in each chamber. Since refills are typically the same for all lasers of a given model, a refill is sometimes followed by as optimization, so that the condition of the gas is optimized for the specific laser in question. As above, this is commonly done by an engineer who test-fires the laser, observes the operating parameters, and attempts to adjust the gas conditions in one or both laser chambers to compensate for any deviation from the desired parameters. Such adjustments are typically done manually, relying on the engineer's experience and judgment.

As with such prior manual optimization processes, the automatic optimization process described herein is performed after the laser chambers are refilled. In the embodiment described herein, the gas in the master oscillator laser Chamber remains fixed after the refill, and only the gas in the amplifier laser chamber is adjusted. Since the amplifier laser chamber presumably contains a desired concentration of fluorine at the end of the refill, only bleeds of gas are allowed during the optimization; no injects are permitted at this point as they might change the fluorine concentration.

In addition to pressure, certain other operating parameters of the laser may be adjusted during optimization. The seed laser module contains a line narrowing element ("LNM"), which may include an optical element that can be adjusted, or "turned," by an actuator to expand or contract the size of the laser beam. Turning the optical element, results in changing the magnification of the laser beam, which results in a change in the spectral bandwidth (or simply "bandwidth") of the beam. As defined, increasing the number of turns results in an increase in the bandwidth of the output energy, and decreasing the number of turns decreases the bandwidth. This direct correlation between turns and bandwidth is actually the result of two inverse correlations. As defined, turning the optical element results in an inverse change in the magnification of the beam, i.e., "increasing" turns decreases the magnification of the beam, and "decreasing" the turns increases magnification. However, magnification itself then has an inverse effect upon bandwidth.)

Spectral bandwidth is commonly measured as E95, i.e., the width of the spectral range that contains 95% of the total spectral energy of the laser beam, although in some cases bandwidth may be measured by full width at half maximum ("FWHM"), the range between the two wavelengths at which the spectral energy of the laser beam is half of the energy of the beam at its maximum value, or other bandwidth metrics. Various types of bandwidth actuators are known to those of skill in the art. It is advantageous to keep the bandwidth of the output within a desired range, neither too wide nor too narrow, so that the energy in the output may be fully utilized.

Another parameter of the laser is known as the MOPA operating point, or "MPOP." MPOP measures how "optimal" the timing between the master oscillator and power amplifier is, as changes to that timing will directly and quickly affect laser efficiency. Changes to MOPA timing will also directly and quickly affect spectral bandwidth. Typically, the peak efficiency delay between a pulse in the master oscillator and the same pulse in the power amplifier might be about 40 nanoseconds (nS); the value of MPOP for this ideal delay is defined to be 0, on a scale of, for example, +1 to −1. Adjusting the value of MPOP will also change the bandwidth, and thus such adjustment provides a separate way of controlling the output bandwidth that is both independent of magnification and can change the bandwidth faster than the actuator motor can change magnification by adjusting the LNM.

The use of these parameters will be explained further below. The method described herein is typically implemented in software, running on a processor, such as controller 116 in FIG. 1. Controller 116 receives feedback of measured values of certain operating parameters as inputs; these include the discharge voltage V, the output energy of the master oscillator $E_{MO}$, and the E95 bandwidth. Controller 116 also receives the values of MPOP and the number of turns of the actuator (or other value of a bandwidth actuator), although these are not measured values but set in response to measured values as explained below. Controller 116 controls operation of the valves, and also controls magnification by turning the optical element in the LNM.

Figure 2:
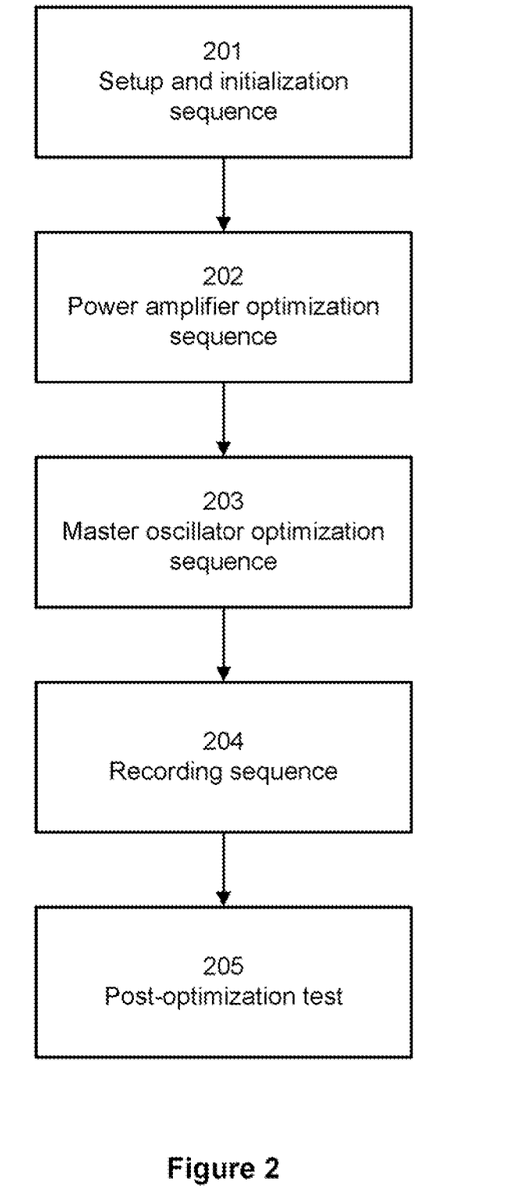
FIG. 2 is a simplified flowchart showing the main steps of a method of an automatic gas optimization of a dual chamber gas laser, such as a MOPA excimer laser, according to one embodiment.

FIG. 2 is a simplified flow chart showing one embodiment of a process for automatically optimizing the gas in the power amplifier chamber of a dual chamber gas laser, such as a MOPA excimer laser. As illustrated and discussed below, the process contains several distinct sequences, including a system initialization and setup sequence (step 201), optimization of the power amplifier chamber (step 202), and optimization of the master oscillator chamber (step 203). These sequences may be optionally followed by a recording sequence (step 204) and a post-optimization test (step 205). The initialization and setup sequence may comprise a separate initialization step during which the laser does not operate, followed by one or more setup sequences during which the laser does operate.

During optimization, an attempt is made to obtain a constant energy output; however, this is not always possible, and in some cases the output energy will be higher than desired. For this reason, in order to prevent damage to the optics of the laser system, in the initialization and setup sequence when the laser is operated it does so at a very low average pulse repetition rate, resulting in a low output power.

In one embodiment, during the setup sequence the laser is operated in a way selected to insure that the output power is well under the laser's maximum intended output until the gas is optimized to be sure too much power will not be delivered during later sequences. For example, the setup sequence may use a continuous mode, in which the laser continuously fires pulses, rather than in a burst mode in which the laser fires pulses in groups, although this is not required. A laser designed to generate pulses of 10 millijoules (mJ) each in continuous mode at a pulse rate of 6 kilohertz (kHz), i.e., 6000 pulses per second, is considered to have a maximum intended output of 60 watts, while one generating pulses of 15 mJ each at the same rate is rated to output 90 watts. In some cases, such a laser will allow a user to select a higher pulse energy. While the user would presumably also select a lower pulse rate, if the laser were to start operating in continuous mode with a higher pulse energy at the 6 kHz rate, damage to the laser could result.

It is noted that various values stated herein are those used with certain MOPA lasers from Cymer, Inc., of San Diego, Calif., although many other lasers will use similar values. One of skill in the art will be able to apply the principles described herein to excimer lasers from other manufacturers or having different operating values.

Returning to FIG. 2, at step 201 an initialization sequence is followed by one or more setup sequences run at a low frequency. As is well known to those of ordinary skill in the art, the purpose of the initialization and setup sequence 201 is to provide initial known values for certain settings so that optimization may proceed from those settings in order to obtain the desired optimal performance of the laser system.

For a MOPA laser, initialization typically includes the determination of energy and voltage targets, and may optionally include the disabling of certain warnings. Since the low output energy of the initialization and setup sequence may be outside of normal operating parameters, warnings for errors in energy output may be disabled or, alternatively, simply ignored. Similarly, warnings for wavelength and bandwidth that are outside of normal operation may also be disabled or ignored during the optimization process. As above, during initialization the laser may not be operated.

Following the initialization, one or more subsequent setup sequences add setting the actuator to a known position, and providing an initial known value of the bandwidth actuator, in this case MPOP. During the setup sequence(s), the laser is operated at a low power. In one embodiment using the stated example of a 60 watt laser able to generate pulses of 10 mJ each at a pulse rate of 6 kHZ, setup sequence may be run at, for example, 200 Hz.

As above, the rate of 200 Hz is selected to insure that the output power during the initialization and setup sequence is sufficiently low that there can be no damage to the optics of the system. Running the setup sequence(s) at a continuous pulse rate of 200 Hz with 10 mJ pulses will result in an output power of 2 watts. This is well below the rated output of 60 watts, and low enough that there will be no damage to the optics of the laser even if the pulses generated initially are at an energy of greater than 10 mJ each; this may occur due to the high pressure of the refill (at the highest operating pressure in the power amplifier, so that only bleeding is necessary during optimization) and the high efficiency of the laser after refill, even at the lowest possible operating voltage. One of skill in the art will appreciate that the pulse rate may be altered depending upon the parameters of a particular laser which is the subject of the optimization process. In some embodiments, where there is a second setup sequence, the second setup sequence may be run at a higher rate that is still below the nominal operating power of the laser.

During the setup sequence(s), the discharge voltage V is measured and compared to a target discharge voltage VTARGET. If the discharge voltage is less than the minimum discharge voltage VTARGET, gas is bled from the power amplifier chamber until the discharge voltage is equal to or greater than VTARGET. The gas bleed may be done in a continuous manner, or may be performed in incremental steps so that the discharge voltage may be reliably read at a stable pressure after each increment.

Figure 3:
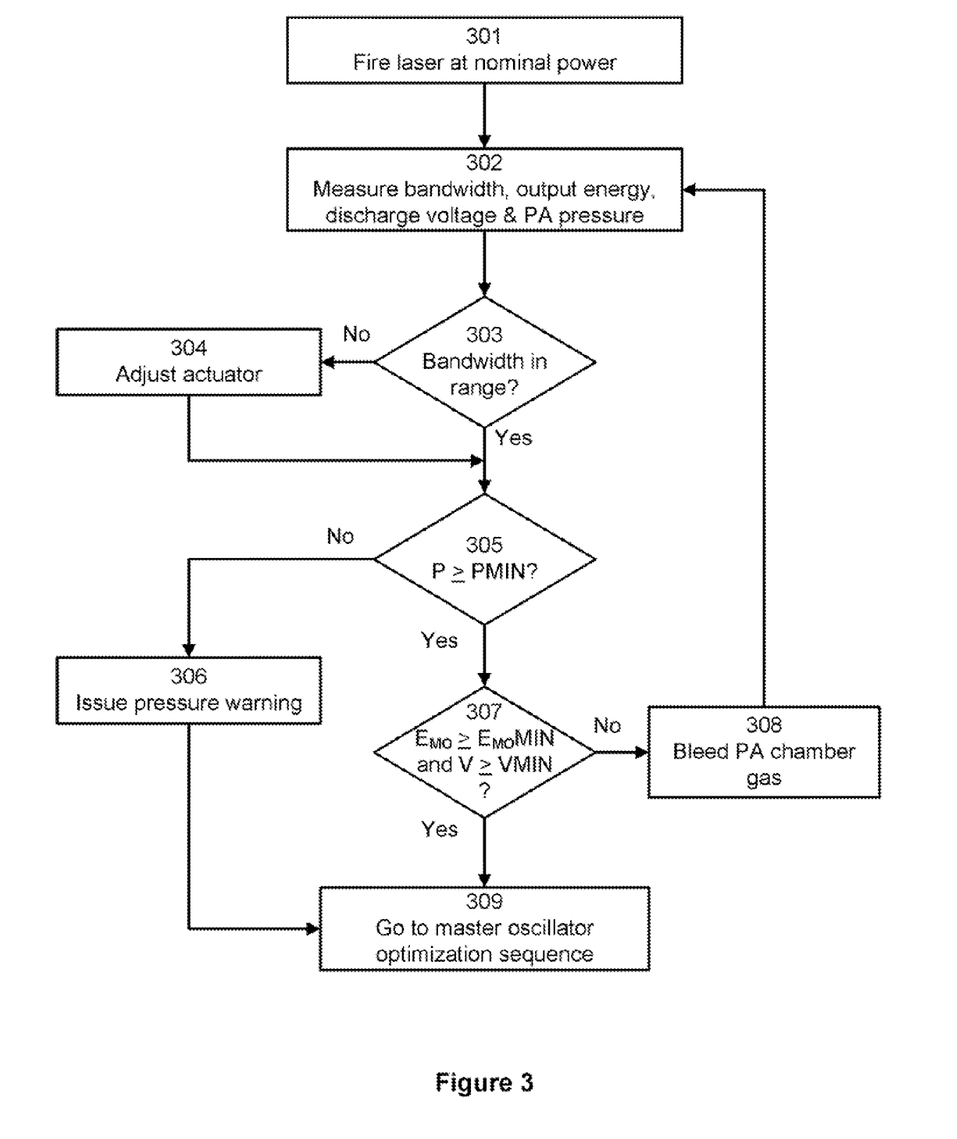
FIG. 3 is a simplified flowchart showing more detailed steps of one embodiment of a power amplifier optimization sequence from FIG. 2.

Once initialization and setup is complete, at step 202 the gas in the power amplifier is optimized. FIG. 3 is a flowchart showing more detailed steps of one embodiment of the sequence 202 for optimizing the power amplifier.

At step 301, the laser is fired at its nominal power, i.e., with a burst pattern that is intended to approximate both the expected output power and how the laser will actually be fired by a typical customer; the burst pattern may in some cases represent the pattern that the laser manufacturer believes yields the best performance in operation.

A burst pattern is typically specified by three parameters, the repetition rate, the number of pulses in the burst, and the time between bursts. A burst pattern for the main optimization sequence may be selected by either the laser manufacturer or the user, although a default setting may be stored in memory, and once selected it is not changed during the optimization process. For example, in the case of the laser above generating pukes at 10 mJ each at a maximum rate of 6 KHz for a maximum intended output of 60 watts, a burst pattern of 600 pukes per burst at the 6 KHz rate with 100 msec between bursts may be used. This represents a duty cycle of 50% of maximum pulse rate, so that at 10 mJ per pulse the power output will be 30 watts.

Next, at step 302, the operating parameters of the laser system are measured. These include the output energy of the master oscillator $E_{MO}$, the discharge voltage required to produce the laser pulses at that output energy, the bandwidth of the output beam (again generally at E95), and the pressure in the power amplifier laser chamber.

At step 303, it is determined whether the bandwidth is within the desired range. If the bandwidth is within the desired range, the process proceeds to step 305; if the bandwidth is not within the desired range, at step 304 the actuator is adjusted to change the magnification of the LNM and bring the bandwidth into the desired range.

At step 305, it is determined whether the pressure in the power amplifier chamber is greater than or equal to a minimum value MN. If the measured pressure is below PMIN, a warning is issued to the user at step 306 indicating that this is the best optimization that can be obtained while still meeting the minimum pressure, and the process proceeds to the master oscillator optimization sequence at step 309.

If the pressure is equal to or above MIN, it is next determined at step 307 whether the output energy $E_{MO}$ is greater than or equal to a minimum value $E_{MO}$MIN, and whether the discharge voltage V is greater than or equal to a minimum value VMIN. If both the output energy and discharge voltage equal or exceeds their respective minimum values, then the process again proceeds to the master oscillator optimization sequence at step 309.

If at step 307 either the output energy or the voltage is not greater than its desired minimum value, then at step 308 the amplifier laser chamber gas is bled to reduce the pressure by a fixed increment. Bleeding gas reduces the pressure, which increases the discharge voltage and therefore Bin. After a wait of a few seconds to allow for transients, in one embodiment 3 seconds, the process returns to step 302, and the indicated parameters are measured again. When step 307 is reached again, if $E_{MO}$ and the discharge voltage are now greater than or equal to their desired minimum values (and the bandwidth is within range and the pressure is still greater than PMIN), the process again moves to the master oscillator optimization sequence at step 309.

If either $E_{MO}$ or the discharge voltage is still less than its desired minimum value, step 308 is repeated and the gas is again bled, and the process again returns to step 302 for measurement of the various parameters. In one embodiment, the gas is bled by the same increment each time in other embodiments the bleed increment may be changed at each iteration, for example based upon the change in the output energy and/or the discharge voltage as a result of the prior bleed. Steps 302 to 308 will repeat until one of the conditions leading to step 309 and the master oscillator optimization sequence occurs, i.e., the pressure is less than PMIN, or the pressure is greater than or equal to PMIN, and $E_{MO}$ and the discharge voltage are greater than or equal to their desired minimum values.

It should be noted that while the optimization process shown in FIG. 3 contains steps shown in a particular order, in fact some events may occur simultaneously, or may overlap in time. Thus, for example, the actuator may be changing the magnification at the same time that gas is being bled from the chamber.

One of skill in the art will appreciate how to control magnification of the laser beam by using an actuator, which in some embodiments may be a stepper, to turn the optical element in the LNM. The measured bandwidth, such as E95, is compared to the desired target bandwidth. A filter is used to exclude very small errors and mitigate noise, and the resulting error signal is amplified and integrated over time so that greater adjustments are made when the bandwidth varies from the target bandwidth for a longer period of time. Based upon the magnitude of the resulting signal, the actuator turns the LNM to change the magnification of the laser beam and alter the bandwidth of the output energy; as stated above, increasing turns increases bandwidth, and decreasing turns decreases bandwidth. Also as above, other types of bandwidth actuators may be used to similar effect.

In one embodiment, the bleeding of gas from the amplifier laser chamber is accomplished, by opening the fill valve for the amplifier laser chamber for a fixed period of time, rather than attempting to measure the actual drop in pressure. The system may provide a default value for the period of time that the valve is to be opened, or allow the user to set a value.

The values of $E_{MO}$MIN, VMIN and PMIN are set so as to insure that the laser remains within safe operating parameters. The physics of the laser dictate a minimum safe discharge voltage; if the voltage goes below its minimum value, it is an indication that the output energy of the laser is too high, and that the discharge voltage is being driven down to pull the output energy down. Since this condition may result in damage to the laser, the laser is typically automatically shut off if the discharge voltage goes below this minimum value. To ensure that this value of discharge voltage is not reached, VMIN is set higher than the physical limit, in one embodiment by approximately 50 volts.

Similarly, the physics of the laser also dictate a minimum pressure below which the laser will not operate safely. The value of PMIN is thus also set above this pressure, in one embodiment by approximately 1.5 kilopascals (kPa). The bleed time, 0.6 seconds in this example, is set to be such that a bleed results in a pressure decrease of less than 15 kPa so that if the pressure is determined to be above PMIN at step 303 and a bleed then occurs, the pressure will still be above the physical limit needed for safe operation of the laser.

By contrast, the value of $E_{MO}MIN$ is simply an output energy level below which the laser is not usable for its intended purpose, typically processing semiconductor wafers. While dropping below this value will not damage the laser, there is no point in optimizing the laser to operate in a condition that is not useful.

In one embodiment, there are default values for VTARGET and PMIN, for example, 910 volts for VMIN, 220 kPa for PMIN, and 0.9 mJ for $E_{MO}MIN$. In other embodiments, the user may vary these parameters.

As with VTARGET, it is well known in the art that there is a true maximum output energy and maximum discharge voltage defined by the physical limits of the laser. It is also known that during operation, the discharge voltage tends to increase as fluorine is consumed. Thus, there are also values of $E_{Mo}MAX$ and VMAX that limit operation of the laser. These values are set to be well below the physical limit of the laser to allow for the increase in voltage during operation. For example, a laser might have a physical limit at around 1150 volts, and VMAX might be set 100 volts lower, or 1050 volts, while as above, VTARGET for such a laser might be around 910 volts. A typical value of $E_{MO}MAX$ might be 1.7 mJ.

Thus, if the output energy is over $E_{Mo}MAX$ or the voltage is over VMAX, the process should terminate, as the current gas condition will be the best result that can be obtained by the optimization process. In one embodiment, a warning may also be issued to the user that either the master oscillator energy or the voltage is too high, so that the user may continue to monitor the laser chamber pressure if desired.

Figure 4:
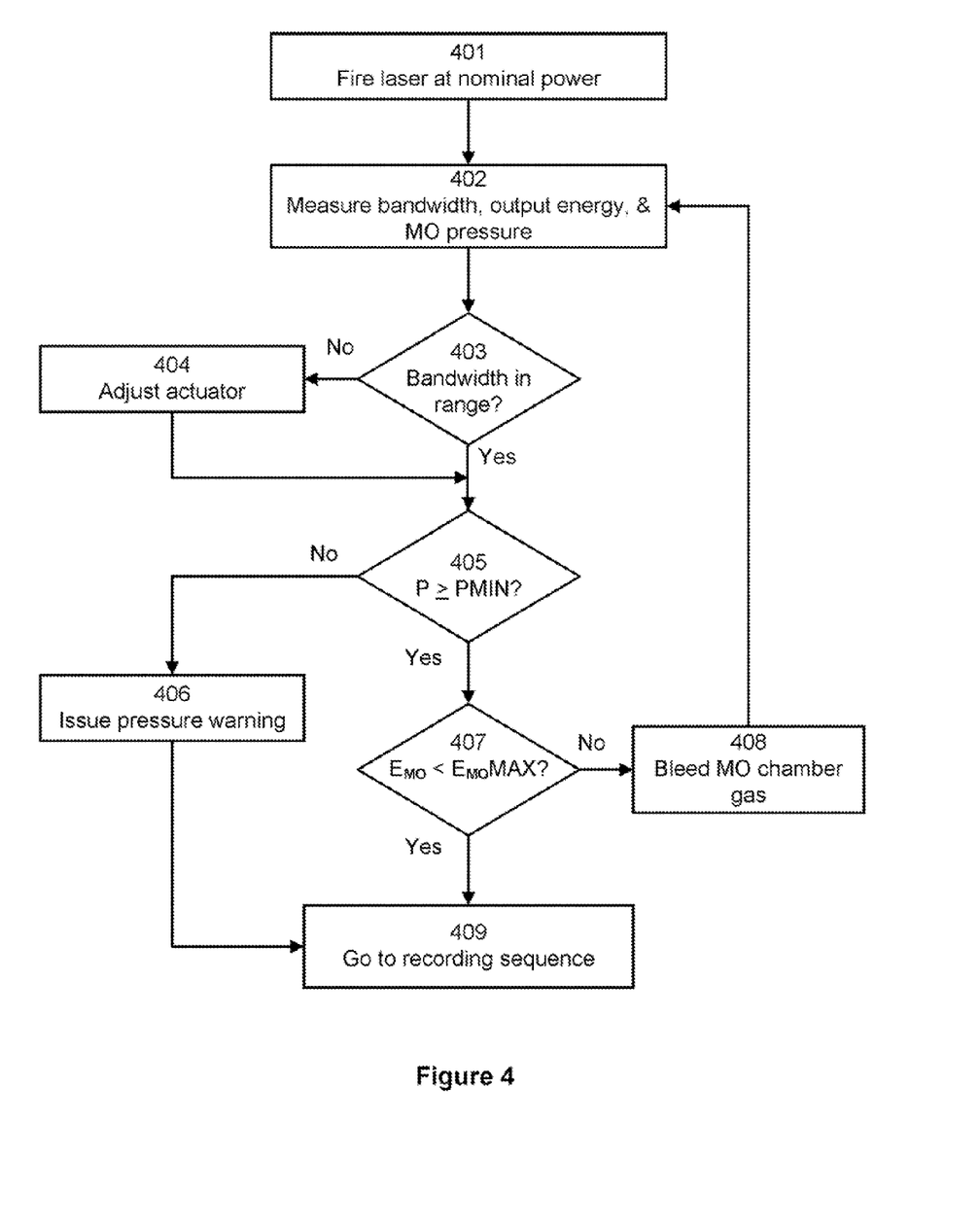
FIG. 4 is a simplified flowchart showing more detailed steps of one embodiment of a master oscillator optimization sequence from FIG. 2.

FIG. 4 is a flowchart showing more detailed steps of one embodiment of the sequence 203 for optimizing the master oscillator.

The master oscillator optimization sequence is nearly identical to the power amplifier optimization sequence of FIG. 3. The steps shown in FIG. 4 are essentially the same as those shown in FIG. 3, and the master oscillator optimization sequence runs in the same way as described, above with reference to the power amplifier optimization sequence with one difference. In the master oscillator optimization sequence, the discharge voltage is no longer measured and compared to a minimum value, as this has already been clone in the power amplifier optimization sequence, and the discharge voltage is the same for both chambers.

Thus, during the master oscillator optimization sequence, at some point the bandwidth should be within the desired range, and either the master oscillator energy $E_{MO}$ will be equal to or less than $E_{MO}MAX$ and the pressure equal to or greater than PMIN, or the pressure will fall below PMIN. Either of these conditions ends the master oscillator optimization sequence. The process then goes to the recording sequence at step 409.

At this point the gases in both the power amplifier laser chamber and the master oscillator laser chamber are considered to be optimized for normal operation of the specific laser, and normal operation may commence at the best possible pressure conditions. Further adjustments to bandwidth during normal operation may be made by changing the value of MPOP, which, as above, may result in faster changes to bandwidth than the actuator. Again, in some embodiments, MPOP may be set to an arbitrary value during optimization, as long as it is not too close to either end of its range at the end of optimization, which would overly restrict its range during normal operation. The actuator may also be used during normal operation.

The optimal gas condition resulting from the described optimization provides a good basis for subsequent injects of fluorine containing gas into the chambers to compensate for the consumption of fluorine by operation of the laser, and should allow the laser to operate longer before requiring a full refill. Various ways of performing such injects are well known to those of skill in the art.

In practice, the automated gas optimization process described herein adds about 6 minutes to the time it takes to refill the laser chambers. With an automated refill process, an entire refill and optimization may be accomplished in less than 26 minutes, compared to an hour or more for prior art refills plus manual optimization. Further, the optimization process herein should result in the best possible initial gas condition when the automated refill process results in a highly accurate fluorine concentration.

The gas optimization process again may be followed by a recording sequence, as in step 204 in FIG. 2, in which the values and settings resulting from the optimization process may be recorded for later use, either in evaluating the performance of the system or setting initial values for a later optimization process. This in turn may be followed by an automatic post-optimization test as in step 205 in FIG. 2, in which the laser system may be tested to ensure that it is operating within desired parameters and providing adequate and expected output energy. How to perform both a recording sequence and a post optimization test will be well known to those of skill in the art.

The described system and method can also be a valuable diagnostic tool, as the final values of the laser parameters after gas optimization, such as voltage, master oscillator energy, etc., are significant in determining the condition of the laser. Tracking the results of each gas optimization during the laser's life span can provide valuable information on how the laser evolves over time, and potentially be of value in future laser design and improvement.

The disclosed method and apparatus has been explained above with reference to several embodiments. Other embodiments will be apparent to those skilled in the art in light of this disclosure. Certain aspects of the described method and apparatus may readily be implemented using configurations or steps other than those described in the embodiments above, or in conjunction with elements other than or in addition to those described above.

For example, it will be understood by those skilled in the art that, while the preferred embodiment is a master oscillator-power amplifier multi-chambered excimer or molecular fluorine gas discharge laser system ("MOPA") it is anticipated that the system and method may also be used with other oscillator/amplifier configurations, such as a master oscillator-power oscillator "MOPO"), a power oscillator-power amplifier ("POPA") or a power oscillator-power oscillator ("POPO") configuration, or the like. It will also be understood that in each of such configurations the output of the first oscillator stage is amplified in some fashion in the second stage, regardless of whether the second stage is a power amplifier or a power oscillator.

Similarly, unless otherwise indicated specifically to the contrary reference to a master oscillator stage or chamber ("MO") in the Specification or the appended claims, and/or a power amplifier stage or chamber ("PA") in the Specification or appended claims, shall be considered to be broad enough to cover any oscillator first stage or chamber feeding an output into any amplifier second stage or chamber for amplification, and the term oscillator chamber or oscillator stage is broad enough to corner any such oscillator stage and the term amplifier chamber or stage is broad enough to cover any such amplifier stage.

It should also be appreciated that the described method and apparatus can be implemented in numerous ways, including as a process, an apparatus, or a system. The methods described herein may be implemented by program instructions for instructing a processor to perform such methods, and such instructions recorded on a computer readable storage medium such as a hard disk drive, floppy disk, optical disc such as a compact disc (CD) or DVD, flash memory, etc. The methods may also be incorporated into hard-wired logic if desired. It should be noted that the order of the steps of the methods described herein may be altered and still be within the scope of the disclosure.

These and other variations upon the embodiments are intended to be covered by the present disclosure, which is limited only by the appended claims.

What is claimed is:

1. A dual chamber gas discharge laser light source, comprising:
   a master oscillator having a laser chamber containing a lasing medium gas comprising a halogen for producing an output energy;
   an amplifier having a laser chamber containing a lasing medium gas comprising a halogen for producing an amplified output energy;
   a gas optimization system including a controller automatically executing an optimization scheme after a refill of the gas in the master oscillator and amplifier laser chambers, the optimization scheme comprising:
      a first sequence in which the laser is fired at a first target power level while:
         measuring a discharge voltage and, if the discharge voltage is below a predetermined minimum value, bleeding gas from the amplifier chamber until the discharge voltage is equal to or greater than the minimum value; and
         setting to an initial position a controller which adjusts magnification of an optical element in a laser beam path in the master oscillator to an initial position;
      a second sequence in which the laser is fired in bursts at a second target power level while measuring the output energy of the master oscillator, bandwidth of the output, and discharge voltage, and;
         if a spectral bandwidth of the output beam is not within a desired range, changing the position of the controller which adjusts magnification of the optical element in the master oscillator until the bandwidth is within the desired range;
         if either the output energy or the discharge voltage are below a respective predetermined minimum value, bleeding gas from the amplifier chamber until both the output energy and the discharge voltage are equal to or greater than their respective minimum values or the pressure in the amplifier chamber falls to a minimum value; and
      a third sequence in which the laser is fired in bursts at the second target power level while measuring the output energy of the master oscillator and bandwidth, and;
         if the bandwidth is not within the desired range, changing the magnification of the laser beam in the power amplifier until the bandwidth is within the desired range;
         if the output energy is above a predetermined target maximum value, bleeding gas from the master oscillator chamber until the output energy is equal to or less than its target maximum value.

2. The dual chamber gas discharge laser light source of claim 1 wherein the halogen comprises fluorine.

3. The dual chamber gas discharge laser light source of claim 1 wherein the rate at which the laser is fired during the first sequence is calculated, to result in a power output of approximately a few percent of the maximum power output of the laser.

4. The dual chamber gas discharge laser light source of claim 1 wherein the bursts fired by the laser during the second and third sequences are calculated to result in a power output that is approximately equal to the power output which the laser is expected to generate during normal operation.

5. The dual chamber gas discharge laser light source of claim 1 wherein the optimization scheme further comprises bleeding gas from the amplifier chamber in determined increments.

6. The dual chamber gas discharge laser light source of claim 1 wherein the optimization scheme further comprises measuring the pressure in the amplifier chamber during the first sequence and, if the pressure drops below a predetermined value, stopping the first sequence and commencing the second sequence.

7. The dual chamber gas discharge laser light source of claim 1 wherein the optimization scheme further comprises measuring the pressure in the amplifier chamber during the second sequence and, if the pressure drops below a predetermined value, stopping the second sequence and commencing the third sequence.

8. The dual chamber gas discharge laser light source of claim 1 wherein the optimization scheme further comprises measuring the pressure in the master oscillator chamber during the third sequence and, if the pressure drops below a predetermined value, stopping the third sequence.

9. The dual chamber gas discharge laser light source of claim 1 wherein the optimization scheme further comprises stopping the second sequence if the output energy is greater than a respective predetermined maximum value during the second sequence.

10. The dual chamber gas discharge laser light source of claim 1 wherein the optimization scheme further comprises during the first sequence initializing a bandwidth actuator which adjusts the bandwidth of the output laser beam to a position within a range so that the bandwidth may be adjusted during subsequent operation of the laser light source.

11. A method of automatically optimizing the gas in the amplifier and master oscillator laser chambers of a dual chamber gas discharge laser light source having a master oscillator for producing output energy and an amplifier, each of the master oscillator and amplifier having a laser chamber containing a lasing medium gas comprising a halogen, the method comprising the steps of:
   firing the laser in continuous mode at a first target power level while:
      receiving in a controller a measured value of a discharge voltage and determining in the controller whether the discharge voltage is below a predetermined minimum value, and, if so, directing by the controller that gas be bled from the amplifier chamber until the discharge voltage is equal to or greater than the minimum value; and
      setting to an initial position a controller which adjusts magnification of an optical element in a laser beam path in the master oscillator to an initial position;

firing the laser at a second target power level while receiving in the controller measured values of output energy, bandwidth of the output, and discharge voltage, and;

determining in the controller whether the bandwidth of the output beam is not within a desired range, and, if not, directing by the controller that the magnification of the optical element in the master oscillator be changed until the bandwidth is within the desired range;

determining in the controller whether either the output energy or the discharge voltage are below a respective predetermined minimum value, and, if so, directing by the controller that gas be bled from the amplifier chamber until both the output energy and the discharge voltage are equal to or greater than their respective minimum values or the pressure in the amplifier chamber falls to a minimum value; and upon completion of bleeding gas from the amplifier chamber, determining in the controller whether the output energy is above a predetermined target maximum value, and, if so, bleeding gas from the master oscillator chamber until the output energy is equal to or less than its target maximum value.

12. The method of claim 11 wherein the halogen comprises fluorine.

13. The method of claim 11 wherein the rate at which the laser is fired at the first target power level is calculated to result in a power output of approximately a few percent of the maximum power output of the laser.

14. The method of claim 11 wherein the bursts fired by the laser at the second power level are calculated to result in a power output that is approximately equal to the power output which the laser is expected to generate during normal operation.

15. The method of claim 11 wherein the optimization scheme further comprises bleeding gas from the amplifier chamber in determined increments.

16. The method of claim 11 wherein the optimization scheme further comprises measuring the pressure in the amplifier chamber during the firing at a first power level and, if the pressure drops below a predetermined value, stopping firing at the first target energy and commencing firing at the second power level.

17. The dual chamber gas discharge laser light source of claim 11 wherein the optimization scheme further comprises measuring the pressure in the amplifier chamber during firing at the second power level and, if the pressure drops below a predetermined value, exiting the optimization scheme.

18. The method of claim 11 wherein the optimization scheme further comprises exiting the optimization scheme if the output energy is greater than a predetermined maximum value during firing at the second power level.

19. The method of claim 11 wherein the optimization scheme further comprises exiting the optimization scheme if the discharge voltage is greater than a predetermined maximum value during firing at the second power level.

20. A non-transitory computer-readable medium having embodied thereon a program, the program being executable by a processor to perform a method of automatically optimizing the gas in the amplifier and master oscillator laser chambers of a dual chamber gas discharge laser light source having a master oscillator for producing an output energy and an amplifier, each of the master oscillator and amplifier having a laser chamber containing a lasing medium gas comprising a halogen, the method comprising the steps of:

firing the laser in continuous mode at a first target power level while:

receiving in a controller a measured value of a discharge voltage and determining in the controller whether the discharge voltage is below a predetermined minimum value, and, if so, directing by the controller that gas be bled from the amplifier chamber until the discharge voltage is equal to or greater than the minimum value; and setting to an initial position a controller which adjusts magnification of an optical element in a laser beam path in the master oscillator to an initial position;

firing the laser at a second target power level while receiving in the controller measured values of output energy, bandwidth of the output, and discharge voltage, and;

determining in the controller whether the bandwidth of the output beam is not within a desired range, and, if not, directing by the controller that the magnification of the optical element in the master oscillator be changed until the bandwidth is within the desired range;

determining in the controller whether either the output energy or the discharge voltage are below a respective predetermined minimum value, and, if so, directing by the controller that gas be bled from the amplifier chamber until both the output energy and the discharge voltage are equal to or greater than their respective minimum values or the pressure in the amplifier chamber falls to a minimum value; and upon completion of bleeding gas from the amplifier chamber, determining in the controller whether the output energy is above a predetermined target maximum value, and, if so, bleeding gas from the master oscillator chamber until the output energy is equal to or less than its target maximum value.

* * * * *